Patented Apr. 17, 1928.

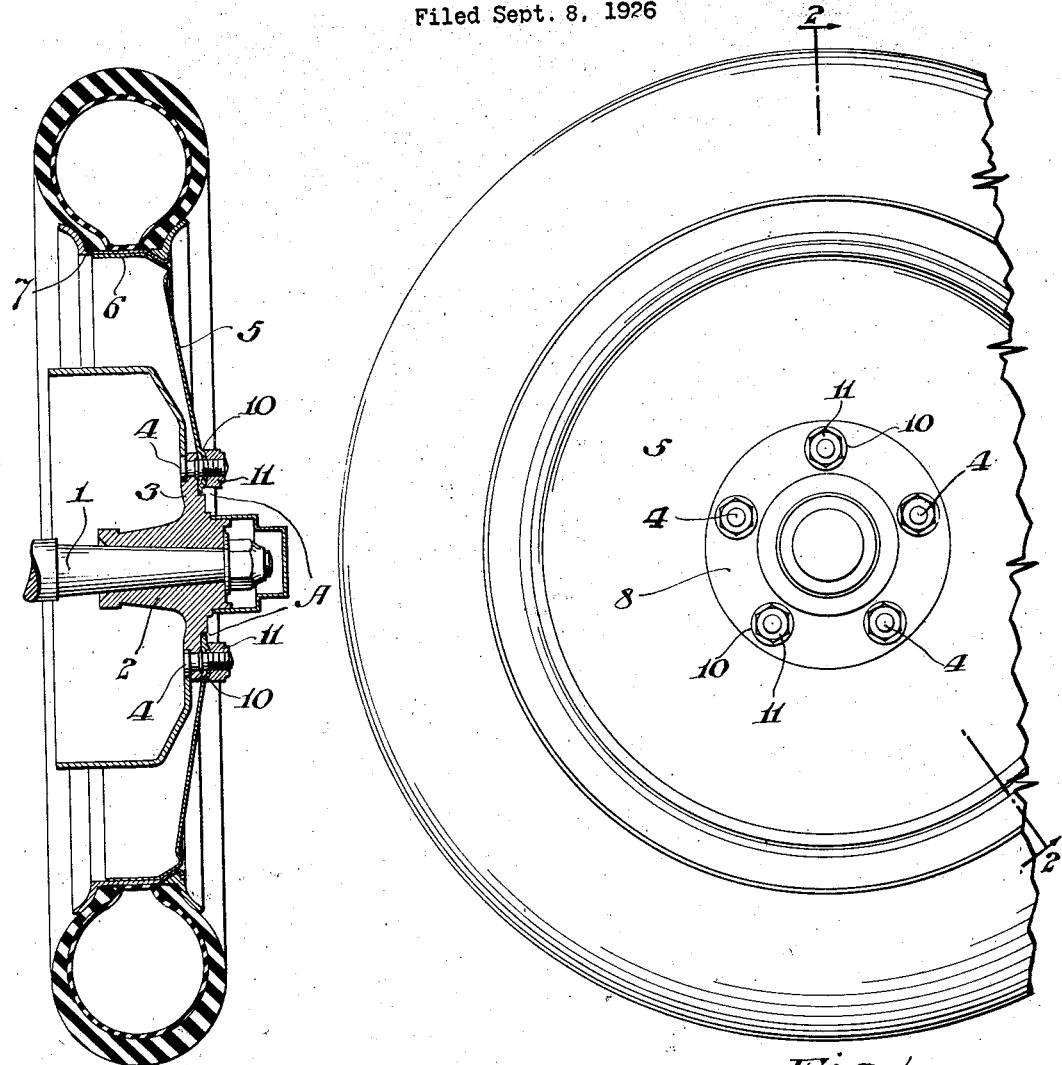

1,666,722

UNITED STATES PATENT OFFICE.

JOHN P. TARBOX, OF PHILADELPHIA, PENNSYLVANIA, ASSIGNOR TO BUDD WHEEL COMPANY, OF PHILADELPHIA, PENNSYLVANIA, A CORPORATION OF PENNSYLVANIA.

DEMOUNTABLE DISK WHEEL.

Application filed September 8, 1926. Serial No. 134,148.

This invention relates to demountable wheels of the type commonly used on automotive vehicles, and has particular reference to an improvement in the means for securing the wheel to the hub flange.

The primary object of the present invention is to provide a wheel fastening arrangement which shall be particularly simple in construction, easy and inexpensive to manufacture, and which shall be highly efficient in retaining the wheel securely in position, yet readily permitting removal of the same as occasion requires.

A further object is to provide a wheel fastening arrangement of the above character in which the various elements are so arranged that rotation of the wheels in the normal direction will tend to exert a force on the securing elements in a direction to tighten the same and thus maintain the parts in tight relation at all times.

Further and more limited objects and advantages will become apparent as the description proceeds.

In the accompanying drawing:

Fig. 1 is a side elevation of a wheel embodying my invention.

Fig. 2 is a sectional view taken on the line 2—2 of Fig. 1 and;

Fig. 3 is an enlarged fragmentary sectional view of the fastening devices.

Fig. 4 is a view showing a modification of the perforated bosses.

In the drawing, the numeral 1 denotes a driving axle of a self propelled vehicle, on which is mounted a hub member 2 that is provided with the usual radial flange 3. An annular series of stud bolts 4 project laterally from the hub flange 3 and these bolts, together with other elements to be referred to hereinafter, serve as the means for detachably connecting the wheel to the hub.

In the present illustration, the wheel is of the dished disk type and comprises an annular dished disk 5, the outer marginal portion whereof is flanged over at 6 to form a seat for a tire carrying rim 7 while the inner marginal portion 8 is substantially flat and is formed with an annular series of apertures 9 having a diameter somewhat greater than the diameter of the stud bolts 4 so that the latter may project freely therethrough. The metal of the disk adjacent each aperture 9 is embossed outwardly to define a convex and substantially spherical protrusion 10 as clearly shown in Fig. 3. These protrusions serve as seats for nuts 11 threaded on the studs 4, and each nut is formed with a recess 12 which has a contour complementary to that of the protrusion with which it cooperates.

The wheel is mounted on the hub by placing the same thereon so that the studs 4 project through apertures 9 in the disk and in this connection it will be noted that the central aperture in the disk which receives the hub 2 is of slightly larger diameter than the hub so that a small clearance denoted as A will be obtained when the wheel is mounted. The nuts 11 are tightened to force the flat inner portion 8 of the wheel into engagement with the hub flange. From the foregoing description and as clearly shown in Fig. 3, it will be apparent that when the nuts are tightened, the wheel is supported entirely by the nuts which in turn are supported by the studs 4 and hub flange 3 and these nuts therefore bear the entire weight of the vehicle. In view of the fact that the nuts 11 bear the entire weight of the vehicle, it is obvious that should these nuts become loosened in any manner, a relative movement will take place between the disk and nuts, and hence by choosing the proper thread for each side of the vehicle, (in this instance a thread of a hand opposite the side of the vehicle) the nuts may be rendered self tightening.

Attention is directed to the fact that the inner flattened portion 8 of the disk requires a minimum of machining, as the central aperture therethrough is of a diameter greater than the diameter of the hub so as to provide the aforementioned clearance A, and hence an accurate fit at this point is unessential. The same is true of apertures 9 with respect to studs 4. The protrusions 10 are preferably formed by punches and dies which are simple in construction and of an inexpensive type. It is therefore obvious that a disk wheel of this general character may be produced at a relatively small expense.

In Fig. 4 I have illustrated a slightly modified form of protrusion wherein each protrusion 10ᵃ is provided with radial slots 14 which greatly increases the resiliency thereof. When the nut is tightened, the segments defined by the slots 14 tend to move toward a common center and in effect a nut lock is provided for the nut.

What I claim as new and useful is:

1. A fastening arrangement for wheels of automotive vehicles comprising a hub having a radial flange, a plurality of stud bolts projecting from said flange, a wheel provided with a plurality of outwardly embossed portions each having an aperture therethrough, said studs being adapted to project freely through said apertures, and nuts threaded on said studs and having recesses adapted to receive said embossed portions.

2. A fastening arrangement for wheels of automotive vehicles comprising a hub having a radial flange, a plurality of stud bolts projecting from said flange, a wheel provided with a plurality of outwardly embossed portions each having an aperture therethrough, said studs being adapted to project freely through said apertures, and nuts threaded on said studs and having recesses of a shape substantially complementary to the shape of said embossed portions and adapted to press said wheel against the hub flange.

3. A fastening arrangement for wheels of automotive vehicles comprising a hub having a radial flange, a plurality of stud bolts projecting from said flange, a wheel having a flattened central portion lying substantially in one plane, and adapted to contact with said radial flange, said flattened portion being provided with a plurality of apertures to receive said stud bolts, the metal of said wheel adjacent said apertures being embossed to define protrussions, and nuts threaded on said stud bolts and having recesses of a shape substantially complementary to the shape of said protrusions and adapted to press said flattened portion against said flange.

4. A fastening arrangement for wheels of automotive vehicles comprising a hub having a radial flange, a wheel having a plurality of apertures therein, the metal of said wheel adjacent said apertures being embossed outwardly to define a plurality of protrusions, a plurality of threaded studs extending from said flange and adapted to project freely through the apertures in said wheel, and nuts so threaded on said studs and having recesses adapted to receive and engage said protrusions that forces are set up during the forward rotation of the wheel to tighten said nuts automatically.

5. A fastening arrangement for wheels of automotive vehicles comprising a hub having a radial flange, a wheel having a plurality of apertures therein, the metal of said wheel adjacent said apertures being embossed outwardly to define a plurality of substantially convex protrusions, a plurality of threaded studs extending from said flange and adapted to project freely through the apertures in said wheel, and nuts so threaded on said studs and having concave recesses adapted to receive and engage said convex protrusions that forces are set up during the forward rotation of the wheel to tighten said nuts automatically.

6. A fastening arrangement for wheels of automotive vehicles comprising a hub having a radial flange, a wheel having a flattened central portion lying substantially in one plane, and adapted to contact with said radial flange, said flattened portion being formed with apertures to freely receive said stud bolts, the metal of said wheel adjacent said apertures being embossed outwardly to define protrusions, and nuts having recesses of a shape substantially complementary to the shape of said protrusions so threaded on said stud bolts as to press said flattened portion against said flange, and to engage said protrusions whereby forces are set up during the forward rotation of the wheel to tighten said nuts automatically.

7. A fastening arrangement for wheels of automotivve vehicles comprising a hub having a radial flange, a wheel having a flattened central portion lying substantially in one plane and adapted to contact with said radial flange said flattened portion being formed with apertures to freely receive said stud bolts and with an enlarged central aperture to freely receive said hub, the metal of said wheel adjacent said apertures being embossed outwardly to define convex protrusions, and nuts threaded on said stud bolts and having recesses of a shape substantially complementary to the shape of said protrusions, and adapted to receive the same to support and press said flattened portion against said flange, said nuts and studs having a thread of a hand opposite to the side of the vehicle whereby forces are set up during the forward rotation of the wheel to tighten said nuts automatically.

8. A fastening arrangement for wheels of automotive vehicles comprising a hub having a radial flange, a plurality of stud bolts projecting from said flange, a wheel provided with a plurality of outwardly embossed portions each having an aperture therethrough and a plurality of radial slots intersecting said apertures, said studs being adapted to project freely through said apertures, and nuts threaded on said studs and having recesses adapted to receive and engage said outwardly embossed portions to press said wheel against the hub flange.

In testimony whereof I hereunto affix my signature.

JOHN P. TARBOX.